(12) United States Patent
Li et al.

(10) Patent No.: US 7,751,517 B2
(45) Date of Patent: Jul. 6, 2010

(54) MULTI-LANE ELASTIC BUFFER CLUSTER FOR CLOCK TOLERANCE COMPENSATION AND DE-SKEW AMONG MULTIPLE RECEIVING LANES

(75) Inventors: Henry Shi Li, Shanghai (CN); Xinpeng Feng, Shanghai (CN)

(73) Assignee: Semiconductor Manufacturing International (Shanghai) Corporation, Shanghai (CN)

( * ) Notice: Subject to any disclaimer, the term of this patent is extended or adjusted under 35 U.S.C. 154(b) by 755 days.

(21) Appl. No.: 11/611,412

(22) Filed: Dec. 15, 2006

(65) Prior Publication Data
US 2008/0130814 A1 Jun. 5, 2008

(30) Foreign Application Priority Data
Nov. 30, 2006 (CN) .................... 2006 1 0119027

(51) Int. Cl.
*H04L 7/00* (2006.01)
(52) U.S. Cl. ...................... 375/354; 375/372
(58) Field of Classification Search ............ 375/354, 375/371, 372
See application file for complete search history.

(56) References Cited

U.S. PATENT DOCUMENTS 6,693,918 B1 2/2004 Dallabetta et al.
6,757,348 B1 * 6/2004 Vila et al. .................... 375/372
7,054,331 B1 * 5/2006 Susnow et al. .............. 370/465
2006/0092969 A1 * 5/2006 Susnow et al. .............. 370/465

* cited by examiner

Primary Examiner—Chieh M Fan
Assistant Examiner—Jaison Joseph
(74) Attorney, Agent, or Firm—Townsend and Townsend and Crew LLP (57) ABSTRACT

System and method for data transfer with buffer control. According to an embodiment, the present invention provides a system for synchronized data communication. The system includes a first communication interface for receiving data and a first clock signal. For example, the first clock signal is associated with a transmitting source. The system also includes a second communication interface for transmitting data. The system further includes a processing component for separating a single data stream into multiple data streams. The system additionally includes a clock that is configured to provide a second clock signal. Also, the system includes a plurality of buffer components for providing temporary storage for data streams. For example, each of the buffer components can be characterized by a predetermined buffer size. The plurality of buffering component includes a first buffer component and a second buffer component.

19 Claims, 9 Drawing Sheets

MULTI-LANE ELASTIC BUFFER CLUSTER FOR CLOCK TOLERANCE COMPENSATION AND DE-SKEW AMONG MULTIPLE RECEIVING LANES

CROSS-REFERENCES TO RELATED APPLICATIONS

This application claims priority to Chinese Patent Application No. 200610119027.80, filed on Nov. 30, 2006, (SMIC Ref. No. 1-05-362) commonly assigned and hereby incorporated by reference for all purposes.

BACKGROUND OF THE INVENTION

The present invention is directed to integrated circuits. More particularly, the invention provides a method and system for data transfer. More specifically, certain embodiments of the present invention provide a data transferring system that provides, among other things, clock synchronization and parallel buffering. For example, the data transferring system provides a controller for efficient and reliable parallel buffering. Certain embodiments of the present invention have been used for data bus of computer system. But it would be recognized that the invention has a much broader range of applicability.

Integrated circuits or "ICs" have evolved from a handful of interconnected devices fabricated on a single chip of silicon to millions of devices. Current ICs provide performance and complexity far beyond what was originally imagined. In order to achieve improvements in complexity and circuit density (i.e., the number of devices capable of being packed onto a given chip area), the size of the smallest device feature, also known as the device "geometry", has become smaller with each generation of ICs. Semiconductor devices are now being fabricated with features less than a quarter of a micron across.

Increasing circuit density has not only improved the complexity and performance of ICs but has also provided lower cost parts to the consumer. An IC fabrication facility can cost hundreds of millions, or even billions, of dollars. Each fabrication facility will have a certain throughput of wafers, and each wafer will have a certain number of ICs on it. Therefore, by making the individual devices of an IC smaller, more devices may be fabricated on each wafer, thus increasing the output of the fabrication facility. Making devices smaller is very challenging, as a given process, device layout, and/or system design often work down to only a certain feature size.

Integrated circuits have a variety of applications. For example, integrated circuits have been utilized for data transferring applications. Over the years, various data transferring techniques have been developed. For example, synchronous and asynchronous data transfer techniques have been widely utilized for various applications. As with any data transferring applications, there is always entity transmitting information, an entity receiving information, and a communication link (e.g., wired communication like, wireless communication, etc.). For example, to ensure accurate and efficient synchronous data transferring, it is often important to synchronize the data transfer with clock signals between the receiving and transmitting entities. Various conventional techniques have been developed for proper synchronization.

Another challenge in data transfer has been to prevent data overflow or underflow during data transfer. In the past, conventional techniques have applied various buffering methodologies to address possible overflow and/or underflow problems. Unfortunately, these techniques for data transferring have been inadequate.

From the above, it is desirable to have an improved technique for data transfer with buffer control.

BRIEF SUMMARY OF THE INVENTION

The present invention is directed to integrated circuits. More particularly, the invention provides a method and system for data transfer. More specifically, certain embodiments of the present invention provide a data transferring system that provides, among other things, clock synchronization and parallel buffering. For example, the data transferring system provides a controller for efficient and reliable parallel buffering. Certain embodiments of the present invention have been used for data bus of computer system. But it would be recognized that the invention has a much broader range of applicability.

According to an embodiment, the present invention provides a system for synchronized data communication. The system includes a first communication interface for receiving data and a first clock signal. For example, the first clock signal is associated with a transmitting source. The system also includes a second communication interface for transmitting data. The system further includes a processing component for separating a single data stream into multiple data streams. The system additionally includes a clock that is configured to provide a second clock signal. Also, the system includes a plurality of buffer components for providing temporary storage for data streams. For example, each of the buffer components can be characterized by a predetermined buffer size. The plurality of buffering component includes a first buffer component and a second buffer component. The first buffer component is configured to received a first clock signal and a second data signal. The first buffer component includes a write pointer and a read pointer. For example, the write pointer is adaptably synchronized to the first flock signal, and the read pointer is adaptably synchronized to the second clock signal. Additionally, the system includes a controller component that is configured to determining an offset value for each of the buffer component. For example, the offset value is associated with a relative position of indicators of the plurality of buffers. The first buffer component inserts or removes one or more offset indicators if the difference between the first clock signal and a second clock signal is greater than a clock threshold value. The first buffer component updates the read pointer based on an offset value determined by the controller component. The first buffer component increments the read pointer if an amount of data stored in the first buffer is greater than a first buffer threshold value. The first buffer component decrements the read pointer if an amount of data stored in the first buffer is less than a second buffer threshold value.

According to another embodiment, the present invention provides a method for synchronized data communication. The method includes a step for providing a plurality of buffers. For example, each of the plurality of buffers is characterized by a buffer size. The plurality of buffers includes a first buffer and a second buffer. The first buffer including a predetermined number of buffer units. The method further includes a step for receiving data and a first clock signal from a transmitting source. The method also includes a step for providing a second clock signal. The method additionally includes a step for distributing the received data to at least the first buffer and the second buffer. Additionally, the method includes a step for providing a read pointer for the first buffer. Furthermore, the method includes a step for providing a write pointer for the first buffer. Also, the method includes a step for determining a relative offset value, for the first buffer based on at least a relative buffer level of the second buffer. In addition, the method includes a step for updating the write pointer in accordance with the first clock signal. Moreover, the method includes a step for updating the read pointer in accordance with the second clock signal, a difference between the first clock signal and the second clock signal, and the relative offset value. The write pointer is incremented based on the first clock signal the and read pointer based on the second clock signal by a buffer unit, if the difference between the first clock signal and the second clock signal is less than a clock threshold value and the relative offset value is zero. The read pointer is modified by a number of buffer units. For example, the number of buffer unites is associated with the relative offset value. The read pointer is incremented by one or more buffer units if an amount of data stored in the first buffer is greater than a first buffer threshold value. The read pointer is decremented by one or more buffer units if an amount of data stored in the first buffer is less than a second buffer threshold value.

According to yet another embodiment, the present invention provides a method for synchronized data communication. The method includes a step for providing a plurality of buffers. For example, each of the plurality of buffers can be characterized by a buffer size. The plurality of buffers includes a first buffer and a second buffer. The first buffer includes a predetermined number of buffer units. The method also includes a step for receiving data and a first clock signal from a transmitting source. In addition, the method includes a step for distributing received data to each of the plurality of buffers. The method also includes a step for providing a second clock signal. The method additionally includes a step for providing a read pointer for the first buffer. Also, the method includes a step for providing a write pointer for the first buffer. Moreover, the method includes a step for determining a relative offset value for the first buffer based on at least a relative buffer level of the second buffer. The method also includes a step for updating the write pointer in accordance with the first clock signal. The method further includes a step for updating the read pointer in accordance with the second clock signal, a difference between the first clock signal and the second clock signal, and the relative offset value. The read pointer is modified by a number of buffer units. For example, the number of buffer unites is associated with the relative offset value. The read pointer is decremented by one or more buffer units if an amount of data stored in the first buffer is greater than a first buffer threshold. The read pointer is incremented by one or more buffer units if an amount of data stored in the first buffer is less than a second buffer threshold.

The present invention provides various advantages over conventional techniques. According to certain embodiments, the present invention provides a method for aligning data among buffers in a multi-lane communication system. For example, skew among buffers are reduced by aligning data stored in buffers. According to a specific embodiment, local and received clock signals are synchronized to avoid underflow and/or overflow problems. Among other things, various embodiments of the present invention provide an efficient and reliable technique for multi-lane communication system. It is to be appreciated that there are other benefits as well.

Depending upon embodiment, one or more of these benefits may be achieved. These benefits and various additional objects, features and advantages of the present invention can be fully appreciated with reference to the detailed description and accompanying drawings that follow.

DETAILED DESCRIPTION OF THE INVENTION

The present invention is directed to integrated circuits. More particularly, the invention provides a method and system for data transferring. More specifically, certain embodiments of the present invention provide a data transferring system that provides, among other things, clock synchronization and parallel buffering. For example, the data transferring system provides a controller for efficient and reliable parallel buffering. Certain embodiments of the present invention have been used for data bus of computer system. But it would be recognized that the invention has a much broader range of applicability.

As discussed various communication techniques have been used in the past for different types of applications. One of widely adopted techniques has been to separating a single data stream into separate data streams and process data streams. Each of the data stream is stored at a separate buffer. Used in conjunction with data synchronized data transfer methods, this technique is used in many applications (e.g., PCI express bus, etc.). Unfortunately, this technique is often inadequate. Among other things, synchronization between external and internal clocks often causes errors in data transmission. Additionally, skew among buffers often leads to inefficient and unreliable data transfer. There are other inadequacies as well. Therefore, it is to be appreciated that the present invention provides an improved system and method for data communication.

Figure 1:
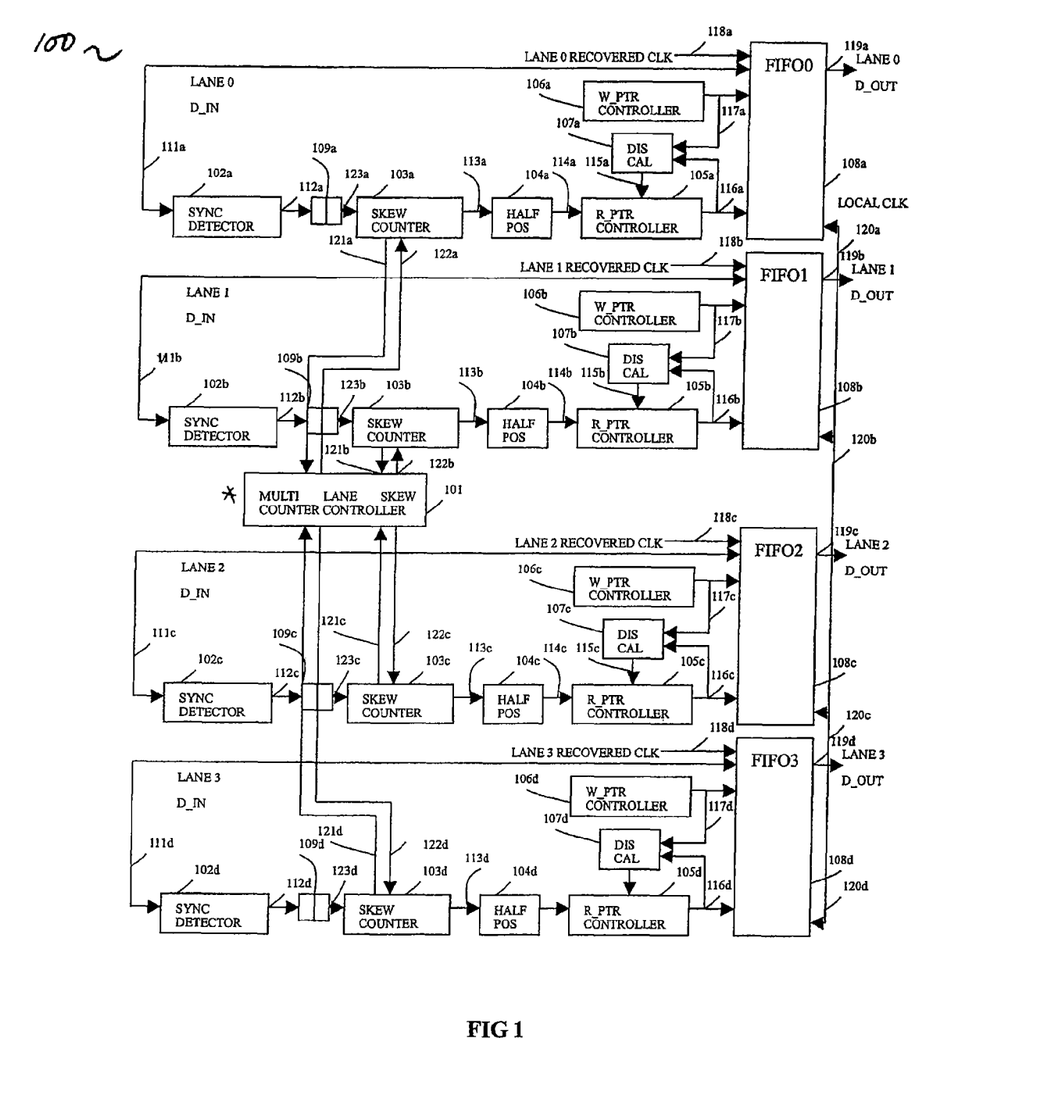
FIG. 1 is a simplified diagram illustrating a controller for data transfer according to an embodiment of the present invention.

FIG. 1 is a simplified block diagram illustrating a buffer system for a communication link used in data communication according to an embodiment of the present invention. This diagram is merely an example, which should not unduly limit the scope of the claims. One of ordinary skill in the art would recognize many variations, alternatives, and modifications.

As shown in FIG. 1, a buffer system 100 includes four transmission lanes. According to an example, data transmitted from a transmitting source are separate into data streams by a processing unit. It is appreciated that the present invention may be practiced with a different number of transmission lanes. The buffer system 100 includes a local common clock 120, a multi-lane skew counter controller 101, and a set of four first-in-first-out data lanes (FIFO) 108 (a-d) and FIFO controllers for each of the four FIFOs. Depending upon application, various embodiment of the present invention be implemented in conjunction of other type of data lanes (e.g., stack, etc.). Each of the FIFO controllers includes a recovered clock 118(a-d), a write pointer 117(a-d), a control circuit for the write pointer 106(a-d), a read pointer 116(a-d), a control circuit for the read pointer 105(a-d), a sync pattern detector 102(a-d), a two-stage latches 109(a-d) for sync pattern detector, a lane skew counter 103(a-d), and a calculator of the distance between the write and the read pointers 107(a-d). For example, a sync pattern can be a string of characters that is used by the communication system to adjust data flow. For each lane, data are received at lane 111 (a-d) into the FIFO 108(a-d) based on each lane's recovered clock 118(a-d), written to a position in the FIFO 108(a-d) based the position of the write pointer 117(a-d) points to. The received data is read from the FIFO 108(a-d) based on the position of the read pointer 1116(a-d).

During write cycles, the write process is synchronized to the recovered clock 118. During the read cycle, the read processes are synchronized to the local clock 120.

The control circuit for the write pointer 106 updates its value for each write process. For example, the writer pointer is implemented by means of a counter and increments on each clock cycle when the FIFO is operating under a normal operational state. In addition, write pointer 106 is used to generate the next write pointer 117.

The common local clock 120, which is connected to four clock interfaces, is provided for all the components of the system 100. The clock interface 120a is coupled to the transmission lane 0, the clock interface 120b is coupled to transmission lane 1, the clock interface 120c is coupled to transmission lane 2, and the clock interface 120d is coupled to transmission lane 3. Each transmission lane is also respectively connected to a recovered clock 118. For example, each of the clocks 118a, 118b, 118c, 118d are independent from one another.

As can be seen, clock 118 and clock 120 are not the same clock. As a result, the clock tolerance compensation is needed between two different time domains. According to certain embodiments, the present invention provides clock tolerance compensation based on Data are received at receiving lanes 111(a-d). Often, different lengths of data stream on the transmission lanes cause skew (i.e., misalignment) among FIFOs. For each transmission lane, a skewed data first goes into the sync detector 102(a-d), a part of the FIFO controller. The sync detector 102 is synchronized to the individual recovered clocks. For example, a signal indicating that "sync pattern detected" is passed through the two stages latches 109. For example, the sync detector 102 can also generate a signal indicating "112 synchronized with local clock", and then provides a signal to the skew counter 103.

The multi-lane skew counter controller 101 works with each transmission lane's skew counter 103(a-d) that stores an amount (e.g., number of clock cycles) of the skew on the link, and provides all the results 113 to a half-position calculator 104. For example, the half-position calculator 104 determines a half-full state for each lane's FIFO by considering multi-lane skew problem, and provides the half-full state information 114 to the read pointer controller 105.

According to an embodiment, the distance calculator 107 for each lane determines the amount of the link's clock rates mismatch 115. The write pointer controller 106 provides the position of the write pointer 117 to the FIFO 108 and the half-distance calculator 107. Based on the half-full state information 114 supplied by the half-position calculator 104 and the amount of the link's clock rates mismatch 115, the control circuit for the read pointer 105 determines the next position of the read pointer 116.

When a sync pattern is detected by the skew counter 123, and the link's clock rates mismatch 115 is greater than the half-full state indication 114, which shows the FIFO 108 is deviated from the half-full state and is likely to overflow, the read pointer 116 will jump to a predetermined a position to reduce the distance between two-pointers 116 and 117. As a result, the overflow problem and/or the possibility thereof are reduced. For example, the read pointer controller 105 omits one cycle of the sync pattern.

When the sync pattern is detected by the skew counter 123, and the link's clock rates mismatch 115 is less than the half-full state indication 114, which shows the FIFO 108 is deviated from the half-full state and is likely to underflow, the read pointer controller 105 holds the position of read pointer 116 for one cycle, to increase the distance between two-pointers 116 and 117. As a result, the underflow problem and/or the possibility thereof are alleviated. According an embodiment, the read pointer controller 105 inserts one cycle of the sync pattern. When the sync pattern is detected 123, and the link's clock rates mismatch 115 is equal to the half-full state indication 114 (i.e., the FIFO 108 is at the half-full state), the read pointer 116 will move to the next position by incrementing one unit of pointer position. For example, the read pointer controller 105 does not modify sync pattern.

It is to be understood that the FIG. 1 and the description thereof merely provides an example, which should not unduly limit the scope of the claims.

Figure 2:
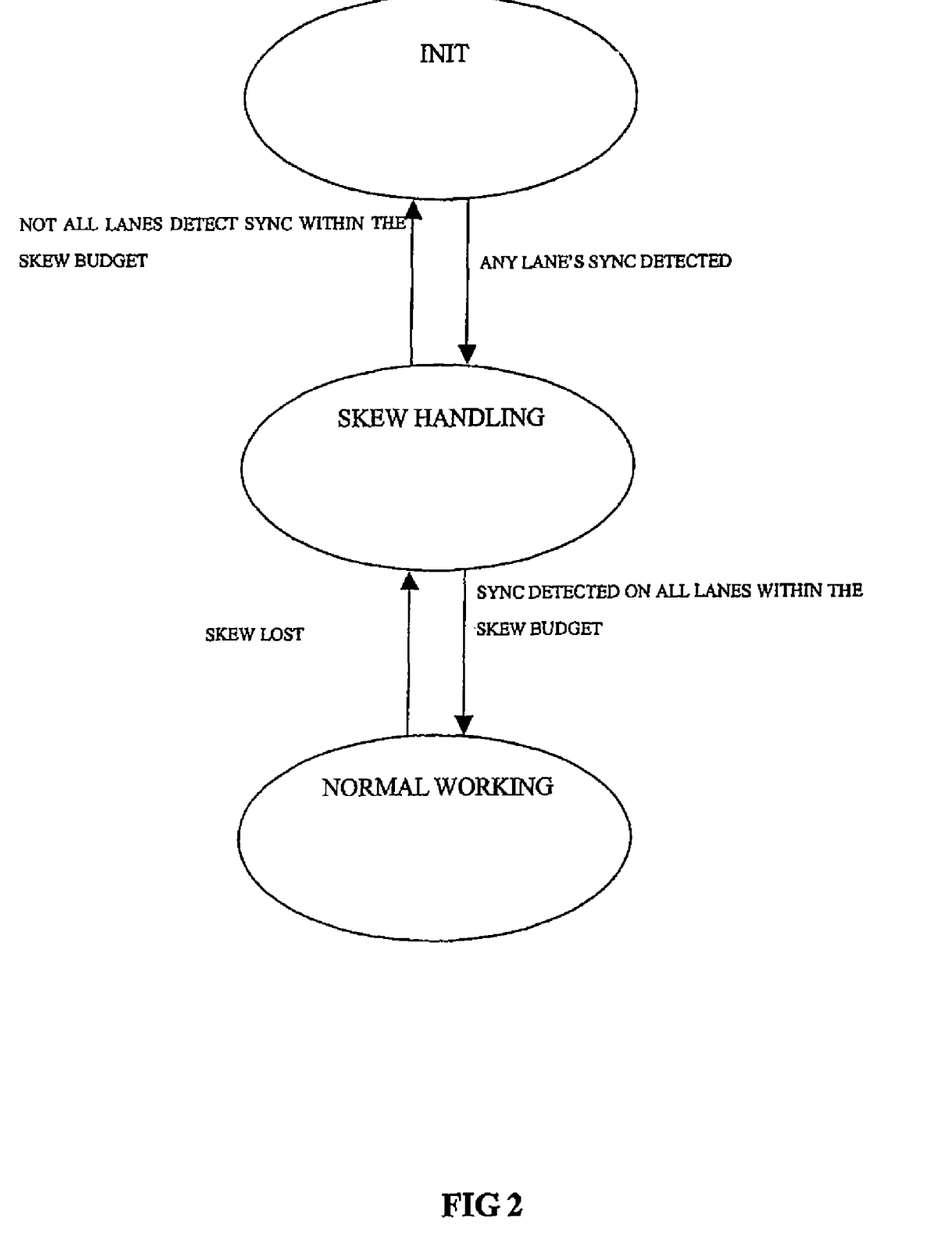
FIG. 2 is a simply a diagram illustrating the operation of a multi-lane skew controller according to an embodiment of the present invention.

FIG. 2 is a simply a diagram illustrating the operation of a multi-lane skew controller according to an embodiment of the present invention. This diagram is merely an example, which should not unduly limit the scope of the claims. One of ordinary skill in the art would recognize many variations, alternatives, and modifications.

As shown in FIG. 2, at the INIT state, a he multi-lane skew counter controller (e.g., the multi-lane skew counter controller 101 in FIG. 1) resets all the lanes' skew counters 103 to 0. When the sync pattern has been detected on any of the four lanes, the multi-lane skew counter controller goes into the SKEW HANDLING state. At the SKEW HANDLING state, if a lane's sync detector 102 detects the sync pattern, its skew counter 103 start to count the skew (i.e., the number of misaligned data cycles/frames) of the lane by comparing the sync pattern position to the other lanes' sync pattern position. On the other hand, if sync patterns have been detected on all the lanes, the multi-lane skew counter controller goes into the NORMAL WORKING state. For example, the multi-lane skew counter controller stores all the skew counters results, and provides all the results to a half-state indicator calculator. If sync patterns have not been detected on all the lanes within a predetermined threshold, the skew is out of the transmission lane's tolerance. For example, when the skew is above a link's tolerance level, the link is not reliable.

At the NORMAL WORKING state, the multi lane skew counter controller monitors the skew among transmission lines. The sync detector 102 monitors sync patterns that appear on each lane. The multi-lane skew counter controller monitors skew by determining relative positions of sync patterns on each lane. For example, after the SKEW HANDLING state, the skew among different buffers returns to the NORMAL WORKING state. Usually, severe link problems cause skew and data losses, and SKEW HANDLING state is necessary. For example, the multi lane skew counter controller 101 returns to the SKEW HANDLING state upon determining various link problems (e.g., serious skew problems, synchronization problems, etc.).

FIG. 3 is a simplified diagram illustrating solving clock synchronization problems in a multi-lane buffer system according to an embodiment of the present invention. This diagram is merely an example, which should not unduly limit the scope of the claims. One of ordinary skill in the art would recognize many variations, alternatives, and modifications.

Figure 3A:
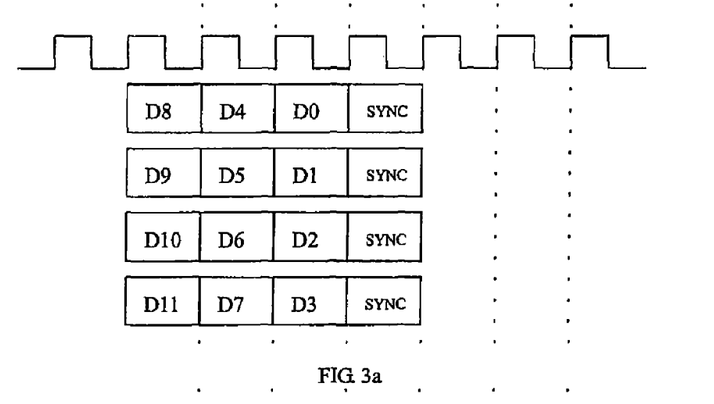
FIG. 3 is a simplified diagram illustrating solving clock synchronization problems in a multi-lane buffer system according to an embodiment of the present invention.
Figure 3B:
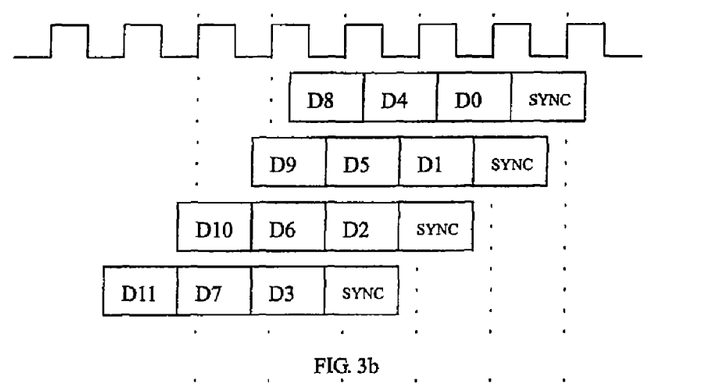
Figure 3C:
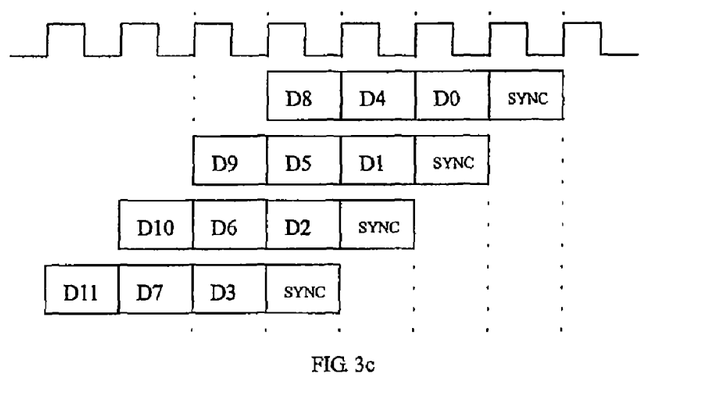

As shown in FIG. 3a, incoming data packets are perfected aligned when originated from the transmitting source. For example, all the data packets are generated by the same clock, which is at the transmitting source. However, due to various factors (e.g., transmission speed, clock synchronization problem, etc.), the data packets becomes skewed, as shown in FIG. 3b. According to a specific embodiment, the data packets are aligned at each buffer by the sync detector at each communication lane. For example, FIG. 3c illustrates that data packets are aligned after synchronizing to local clock.

Figure 4A:
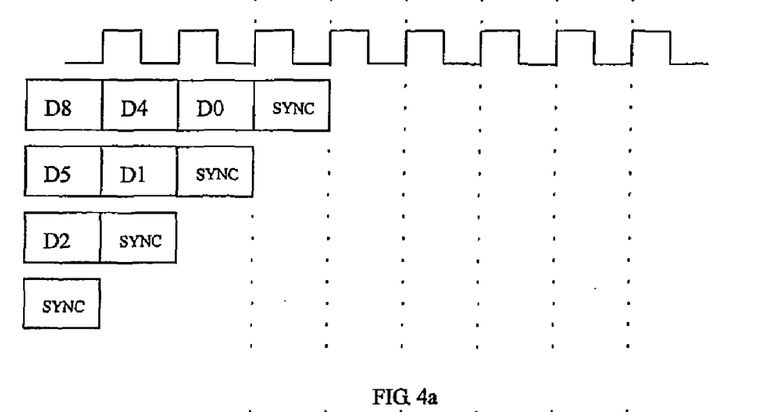
FIG. 4 is a simplified timing diagramming illustrating the operation of a multi-lane skew counter controller according to an embodiment of the present invention.
Figure 4B:
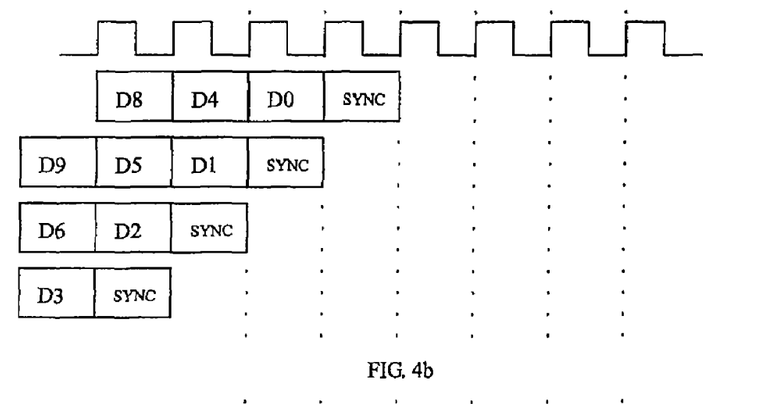
Figure 4C:
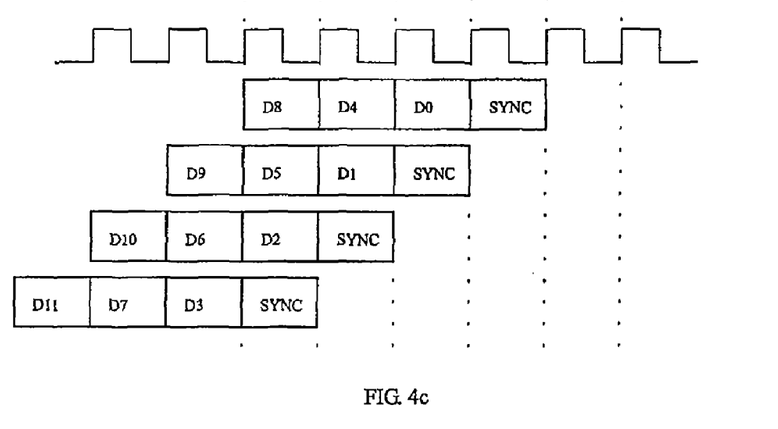

FIG. 4 is a simplified timing diagramming illustrating the operation of a multi-lane skew counter controller according to an embodiment of the present invention. This diagram is merely an example, which should not unduly limit the scope of the claims. One of ordinary skill in the art would recognize many variations, alternatives, and modifications. As shown in FIG. 4a, a sync pattern is first detected on lane 0, and the multi-lane skew counter goes into the SKEW HANDLING state. At the SKEW HANDLING state, the skew counter 103a for lane 0 started to count the skew of the lane compared to the other lanes. For example, the skew counter 103a started counting at "1"; while other lanes' skew counters 103b, 103c, and 103d, stay at "0". At the next local common clock cycle, lane 1's sync detector 102b detected the sync pattern, its skew counter 103b started counting the skew of lane 1 compared to the other lanes, as shown in FIG. 4b. After sync patterns have been determined for each lane, as shown in FIG. 4c, the multi-lane skew counter controller resumes the NORMAL WORKING state and stores skew counter results at each of the skew counters. For example, at lane 0 skew counter 103a results is "4", 103b result "3", 103c result "2", 103d result "1".

FIG. 5 is a simplified diagram illustrating the operation of a buffer according to an embodiment of the present invention. This diagram is merely an example, which should not unduly limit the scope of the claims. One of ordinary skill in the art would recognize many variations, alternatives, and modifications.

As shown in FIG. 5, data transfer becomes misaligned due to mismatch between the recovered clock and the local clock. For example, the recovered clock domain and the local clock domain have slightly different frequencies that cause the misalignment. According to an embodiment, the misalignment is compensated by inserting and/or removing sync character or pattern. For example, when the misalignment is greater than a threshold value, a sync character is inserted.

Figure 5A:
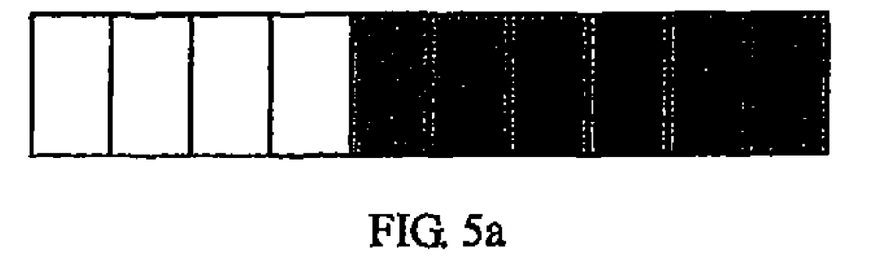
FIG. 5 is a simplified diagram illustrating the operation of a buffer according to an embodiment of the present invention.
Figure 5B:
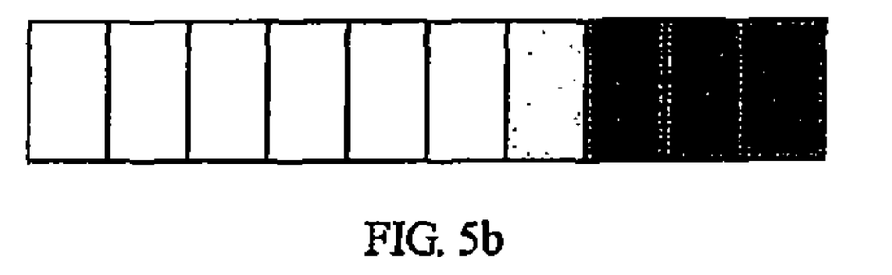
Figure 5C:
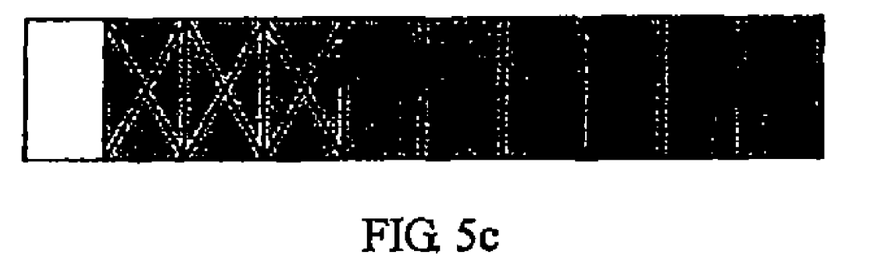

As shown in FIG. 5a, in a buffer's normal state, the buffer is half-full with enough. When the local clock is faster than the recovered clock (read faster than write), buffer underflow occurs, as illustrated in FIG. 5b. According to a specific embodiment, the buffer underflow is compensated by inserting one or more sync characters and/or patterns. On the other hand, when the local clock is slow than the recovered clock (read slower than write), buffer overflow occurs, as illustrated in FIG. 5c. According to a specific embodiment, the buffer overflow is compensated by removing one or more sync characters and/or patterns.

Figure 6:
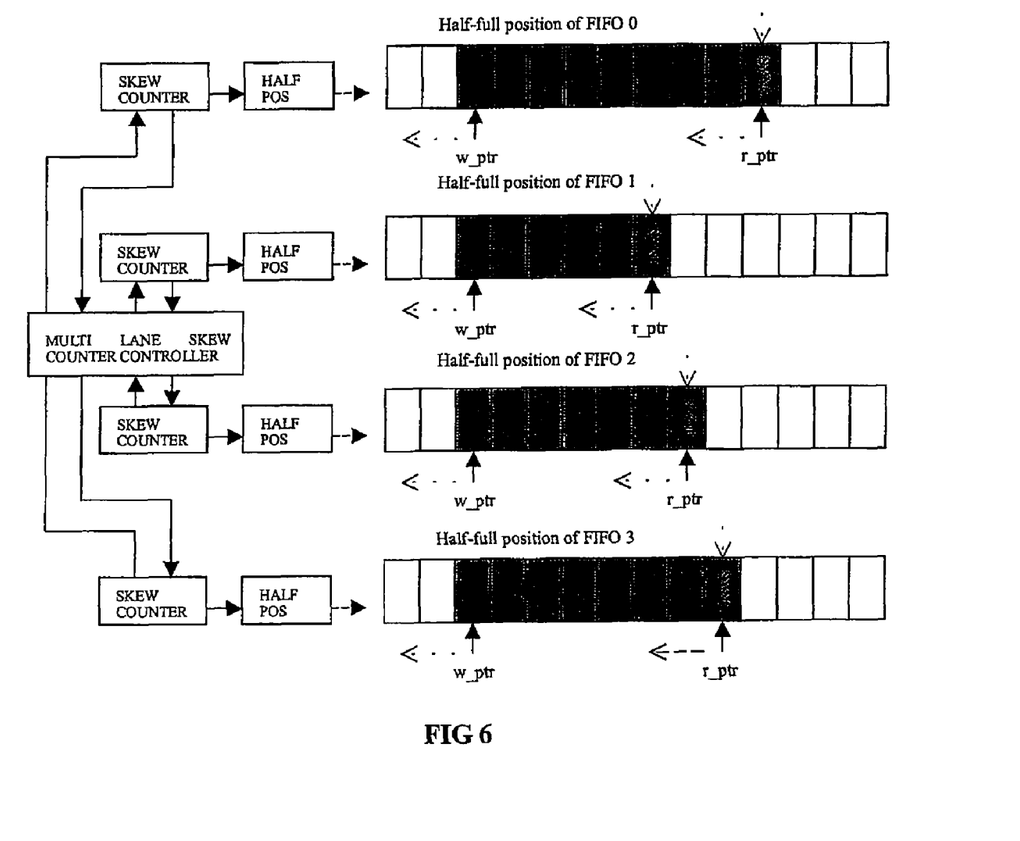
FIG. 6 is a simplified diagram illustrating the operation of a buffer system used in data transmission according to an embodiment of the present invention.

FIG. 6 is a simplified diagram illustrating the operation of a buffer system used in data transmission according to an embodiment of the present invention. This diagram is merely an example, which should not unduly limit the scope of the claims. One of ordinary skill in the art would recognize many variations, alternatives, and modifications. As shown in FIG. 6, the skew counter and the half-position indicator are used to determined the position of read and write pointers. For example, the distance between the read pointer and write pointer is equal to the half-full indicator after proper adjustments are made. As merely an example, the FIFOs work under the normal work state. The read pointer moves to the next position at the each local clock cycle without skipping or holding.

Figure 7:
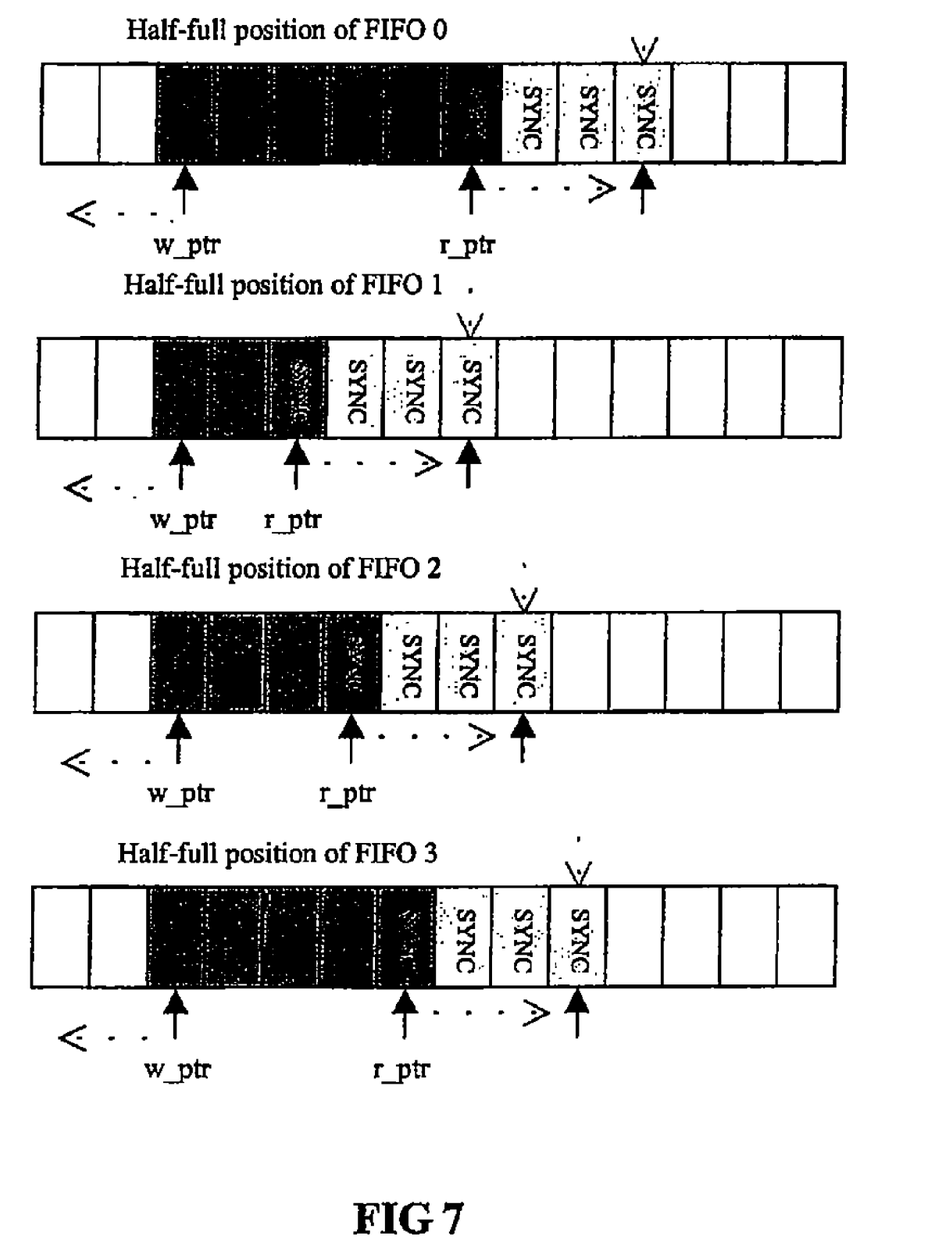
FIG. 7 is a simplified diagram illustrating an operation of a buffer system used in data transmission according to an embodiment of the present invention.

FIG. 7 is a simplified diagram illustrating an operation of a buffer system used in data transmission according to an embodiment of the present invention. This diagram is merely an example, which should not unduly limit the scope of the claims. One of ordinary skill in the art would recognize many variations, alternatives, and modifications. For example, FIG. 7 illustrates a buffering system according to an embodiment of the present invention solving a buffer underflow problem. As shown, the local clock is faster than the recovered clocks. As a result, read cycles are faster than write cycles. For example, for each lane three more symbols have been pulled out of the FIFO than have been deposited into it. According to an embodiment, the buffer system solves this problem by inserting three additional sync symbols into the received sync pattern on each lane. For example, when the lane 1's read pointer points to the sync pattern, the lane 1's distance calculator determines the distance between the read pointer and write pointer. The buffer system causes the read pointer holds for three cycles in order to compensate the misalignment between the local and the recovered clocks, and read out three more sync symbols of the sync pattern.

Figure 8:
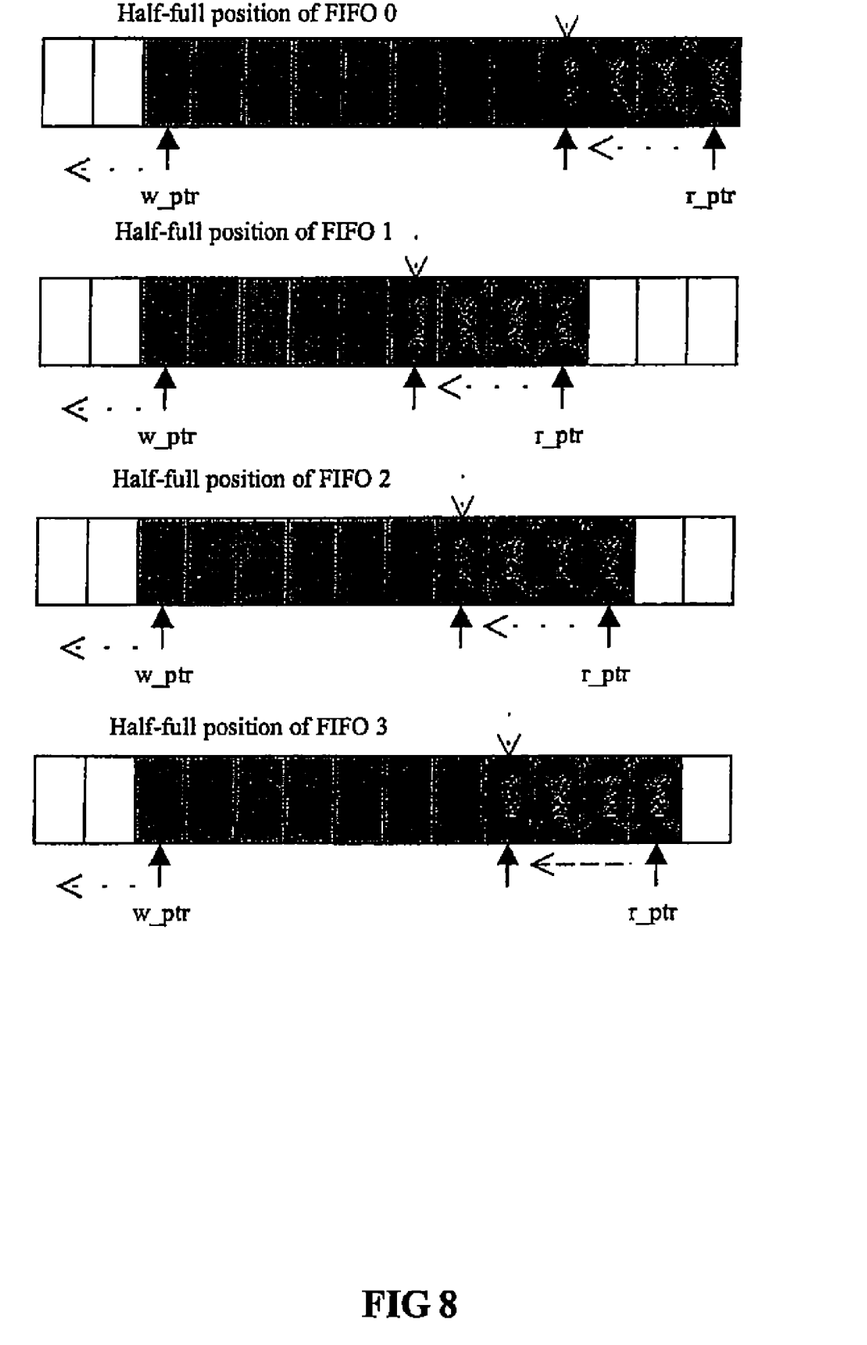
FIG. 8 is a simplified diagram illustrating an operation of a buffer system used in data transmission according to an embodiment of the present invention.

FIG. 8 is a simplified diagram illustrating an operation of a buffer system used in data transmission according to an embodiment of the present invention. This diagram is merely an example, which should not unduly limit the scope of the claims. One of ordinary skill in the art would recognize many variations, alternatives, and modifications. For example, FIG. 8 illustrates a buffering system according to an embodiment of the present invention solving a buffer overflow problem. As shown, the local clock is slower than the recovered clocks. As a result, read cycles are slower than write cycles. According to a specific embodiment, such misalignment is compensated for by removing three sync symbols from the received sync pattern on each lane. For example, when the lane 2's read pointer points to the sync pattern, the lane 2's distance calculator shows the distance between the read pointer and the write pointer. The buffer system causes the read point to jump over three positions in order to compensate misalignment between the recovered and the local clock.

Figure 9:
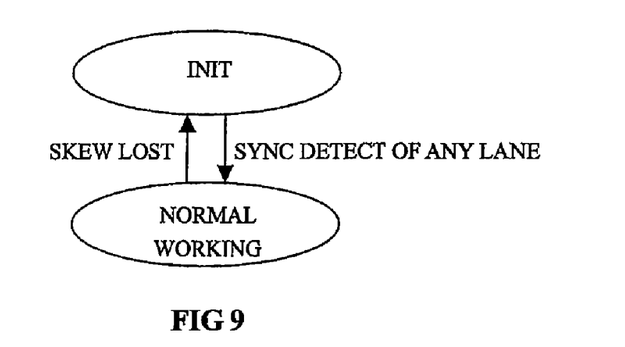
FIG. 9 is a simplified diagram illustrating operation of a controller for write pointer according to an embodiment of the present invention.

FIG. 9 is a simplified diagram illustrating operation of a controller for write pointer according to an embodiment of the present invention. This diagram is merely an example, which should not unduly limit the scope of the claims. One of ordinary skill in the art would recognize many variations, alternatives, and modifications. For example, the controller is the write pointer controller 106a illustrated in FIG. 1. Now referring back to FIG. 9, a controller for a write pointer starts at the INIT state, in which the write pointer is initialized at a predetermined position. For example the write pointer is initialized at the midpoint of a buffer. At the NORMAL WORKING state, the write pointer is incremented for each clock cycle.

Figure 10:
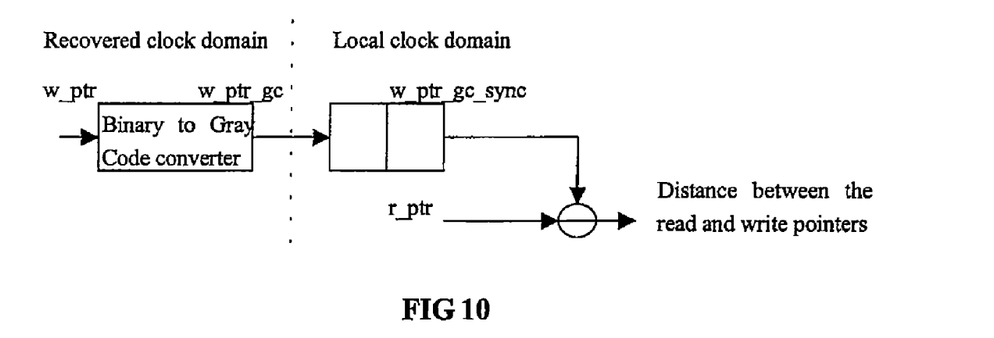
FIG. 10 is a simplified diagram illustrating operation of a distance calculator according to an embodiment of the present invention.

FIG. 10 is a simplified diagram illustrating operation of a distance calculator according to an embodiment of the present invention. This diagram is merely an example, which should not unduly limit the scope of the claims. One of ordinary skill in the art would recognize many variations, alternatives, and modifications. For example, the distance calculator is the distance calculator 107a in FIG. 1. Now referring back to FIG. 10, the distance calculator determines the distance between the read and write pointers that will be used by the read pointer controller. According to an embodiment, the write pointer is updated according to the recovered clock. The write pointer passes a binary to gray code converter and then converts to a gray code. For example, a gray code only has one bit that changes from one count to the next, and thereby limits the potential error due to simple one-count uncertainty. Then the gray code passes a two-latch synchronizer to generate a signal that is fully synchronized with the local common clock. At this point, the distance calculation between the write pointer and the read pointer can be performed base on the local common clock domain.

Figure 11:
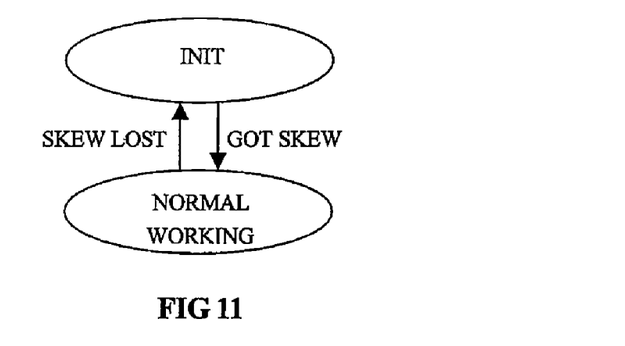
FIG. 11 is a simplified diagram illustrating operation of a controller for read pointer according to an embodiment of the present invention.

FIG. 11 is a simplified diagram illustrating operation of a controller for read pointer according to an embodiment of the present invention. This diagram is merely an example, which should not unduly limit the scope of the claims. One of ordinary skill in the art would recognize many variations, alternatives, and modifications. For example, the controller is the read pointer controller 105a illustrated in FIG. 1. Now referring back to FIG. 11, a controller for a read pointer starts at the INIT state, in which the read pointer is pointed to a predetermined position of a buffer. At the NORMAL WORKING state, the read pointer is updated based on a result from the distance calculator. For example, if the result from the distance calculator is greater than a threshold value, the read pointer points to a threshold value. On the other hand, if the result from the distance calculator is less than a threshold value, the read pointers hold its position to compensate for clock mismatch. Finally, if the result from the distance calculator is equal to a threshold value (i.e., read and write cycles are synchronized), the read pointer simply decrements its values at each clock cycle.

According to an embodiment, the present invention provides a system for synchronized data communication. The system includes a first communication interface for receiving data and a first clock signal. For example, the first clock signal is associated with a transmitting source. The system also includes a second communication interface for transmitting data. The system further includes a processing component for separating a single data stream into multiple data streams. The system additionally includes a clock that is configured to provide a second clock signal. Also, the system includes a plurality of buffer components for providing temporary storage for data streams. For example, each of the buffer components can be characterized by a predetermined buffer size. The plurality of buffering component includes a first buffer component and a second buffer component. The first buffer component is configured to received a first clock signal and a second data signal. The first buffer component includes a write pointer and a read pointer. For example, the write pointer is adaptably synchronized to the first flock signal, and the read pointer is adaptably synchronized to the second clock signal. Additionally, the system includes a controller component that is configured to determining an offset value for each of the buffer component. For example, the offset value is associated with a relative position of indicators of the plurality of buffers. The first buffer component inserts or removes one or more offset indicators if the difference between the first clock signal and a second clock signal is greater than a clock threshold value. The first buffer component updates the read pointer based on an offset value determined by the controller component. The first buffer component increments the read pointer if an amount of data stored in the first buffer is greater than a first buffer threshold value. The first buffer component decrements the read pointer if an amount of data stored in the first buffer is less than a second buffer threshold value. For example, the embodiment is illustrated according to FIG. 1.

According to another embodiment, the present invention provides a method for synchronized data communication. The method includes a step for providing a plurality of buffers. For example, each of the plurality of buffers is characterized by a buffer size. The plurality of buffers includes a first buffer and a second buffer. The first buffer including a predetermined number of buffer units. The method further includes a step for receiving data and a first clock signal from a transmitting source. The method also includes a step for providing a second clock signal. The method additionally includes a step for distributing the received data to at least the first buffer and the second buffer. Additionally, the method includes a step for providing a read pointer for the first buffer. Furthermore, the method includes a step for providing a write pointer for the first buffer. Also, the method includes a step for determining a relative offset value, for the first buffer based on at least a relative buffer level of the second buffer. In addition, the method includes a step for updating the write pointer in accordance with the first clock signal. Moreover, the method includes a step for updating the read pointer in accordance with the second clock signal, a difference between the first clock signal and the second clock signal, and the relative offset value. The write pointer is incremented based on the first clock signal the and read pointer based on the second clock signal by a buffer unit, if the difference between the first clock signal and the second clock signal is less than a clock threshold value and the relative offset value is zero. The read pointer is modified by a number of buffer units, the number of buffer unites being associated with the relative offset value. The read pointer is incremented by one or more buffer units if an amount of data stored in the first buffer is greater than a first buffer threshold value. The read pointer is decremented by one or more buffer units if an amount of data stored in the first buffer is less than a second buffer threshold value. For example, the embodiment is illustrated according to FIGS. 6-8.

According to yet another embodiment, the present invention provides a method for synchronized data communication. The method includes a step for providing a plurality of buffers. For example, each of the plurality of buffers can be characterized by a buffer size. The plurality of buffers includes a first buffer and a second buffer. The first buffer includes a predetermined number of buffer units. The method also includes a step for receiving data and a first clock signal from a transmitting source. In addition, the method includes a step for distributing received data to each of the plurality of buffers. The method also includes a step for providing a second clock signal. The method additionally includes a step for providing a read pointer for the first buffer. Also, the method includes a step for providing a write pointer for the first buffer. Moreover, the method includes a step for determining a relative offset value for the first buffer based on at least a relative buffer level of the second buffer. The method also includes a step for updating the write pointer in accordance with the first clock signal. The method further includes a step for updating the read pointer in accordance with the second clock signal, a difference between the first clock signal and the second clock signal, and the relative offset value. The read pointer is modified by a number of buffer units, the number of buffer unites being associated with the relative offset value. The read pointer is decremented by one or more buffer units if an amount of data stored in the first buffer is greater than a first buffer threshold. The read pointer is incremented by one or more buffer units if an amount of data stored in the first buffer is less than a second buffer threshold value. For example, the embodiment is illustrated according to FIGS. 6-8.

The present invention provides various advantages over conventional techniques. According to certain embodiments, the present invention provides a method for aligning data among buffers in a multi-lane communication system. For example, skew among buffers are reduced by aligning data stored in buffers. According to a specific embodiment, local and received clock signals are synchronized to avoid underflow and/or overflow problems. Among other things, various embodiments of the present invention provide an efficient and reliable technique for multi-lane communication system. It is to be appreciated that there are other benefits as well.

It is understood the examples and embodiments described herein are for illustrative purposes only and that various modifications or changes in light thereof will be suggested to persons skilled in the art and are to be included within the spirit and purview of this application and scope of the appended claims.

What is claimed is:

1. A system for synchronized data communication comprising:
    a first communication interface for receiving data and a first clock signal, the first clock signal being associated with a transmitting source;
    a second communication interface for sending data;
    a processing component for separating a single data stream into multiple data streams;
    a clock being configured to provide a second clock signal;
    a plurality of buffer components for providing data lanes for data streams, each of the buffer components being characterized by a predetermined buffer size, the plurality of buffering component including a first buffer component and a second buffer component, the first buffer component being configured to received a first clock signal and a second data signal, the first buffer component further comprising a write pointer and a read pointer, the write pointer being adaptably synchronized to the first clock signal, the read pointer being adaptably synchronized to the second clock signal;
    a first half-full state calculator configured for determining at least a first half-full state status at least for the first buffer component; and
    a controller component being configured to determining an offset value for each of the buffer component, the offset value being associated with the first half-status and a relative position of indicators of the plurality of buffers;
    wherein:
        the first buffer component inserts or removes one or more offset indicators if the difference between the first clock signal and a second clock signal is greater than a clock threshold value;
        the first buffer component updates the read pointer based on an offset value determined by the controller component;
        the first buffer component increments the read pointer if an amount of data stored in the first buffer is greater than a first buffer threshold value;
        the first buffer component decrements the read pointer if an amount of data stored in the first buffer is less than a second buffer threshold value.

2. The system of claim 1 wherein each of the plurality of buffer components comprises a counter, the counter being configured to store the offset value.

3. The system of claim 1 wherein each of the plurality of buffer components comprises a calculator, the calculator being configured to determine the first buffer threshold value.

4. The system of claim 1 wherein the first buffer component inserts one or more offset indicators if the first clock signal is slower than a second clock signal by the clock threshold value.

5. The system of claim 1 wherein the clock is a local clock of the system.

6. The system of claim 1 wherein the plurality of buffer components has the same buffer size.

7. The system of claim 1 wherein the first buffer threshold value and the second buffer threshold value are the same.

8. The system of claim 1 wherein the first buffer threshold value and the second buffer threshold value are different.

9. The system of claim 1 wherein the second buffer threshold value is associated with the first clock signal and the second clock signal.

10. The system of claim 1 wherein the first buffer threshold value is associated with the first clock signal and the second clock signal.

11. The system of claim 1 wherein underflow occurs when the first clock signal is slower than a second clock signal by the clock threshold value.

12. The system of claim 1 wherein the first buffer component removes one or more offset indicators if the first clock signal is faster than a second clock signal by the clock threshold value.

13. The system of claim 1 wherein overflow occurs when the first clock signal is faster than a second clock signal by the clock threshold value.

14. A method for synchronized data communication comprising:
    providing a plurality of buffers, each of the plurality of buffers being characterized by a buffer size, the plurality of buffers including a first buffer and a second buffer, the first buffer including a predetermined number of buffer units;
    receiving data and a first clock signal from a transmitting source;
    providing a second clock signal;
    distributing the received data to at least the first buffer and the second buffer;
    providing a read pointer for the first buffer;
    providing a write pointer for the first buffer;
    determining a half-full status based at least on the first buffer;
    determining a relative offset value for the first buffer based on at least a relative buffer level of the second buffer and the half-full status;
    updating the write pointer in accordance with the first clock signal; and updating the read pointer in accordance with the second clock signal, a difference between the first clock signal and the second clock signal, and the relative offset value, wherein:
- the write pointer is incremented based on the first clock signal and the read pointer based on the second clock signal by a buffer unit, if the difference between the first clock signal and the second clock signal is less than a clock threshold value and the relative offset value is zero;
- the read pointer is modified by a number of buffer units, the number of buffer unites being associated with the relative offset value;
- the read pointer is incremented by one or more buffer units if an amount of data stored in the first buffer is greater than a first buffer threshold value;
- the read pointer is decremented by one or more buffer units if an amount of data stored in the first buffer is less than a second buffer threshold value.

15. The method of claim 14 wherein the second clock signal is provided by a local clock.

16. The method of claim 14 wherein the first buffer threshold value and the second buffer threshold value are the same.

17. The method of claim 14 wherein the first buffer threshold value is associated with a difference between the first clock signal and a second clock signal.

18. The method of claim 14 wherein the second buffer threshold value is associated with a difference between the first clock signal and a second clock signal.

19. A method for synchronized data communication comprising:
- providing a plurality of buffers, each of the plurality of buffers being characterized by a buffer size, the plurality of buffers including a first buffer and a second buffer, the first buffer including a predetermined number of buffer units;
- receiving data and a first clock signal from a transmitting source;
- distributing received data to each of the plurality of buffers;
- providing a second clock signal;
- providing a read pointer for the first buffer;
- providing a write pointer for the first buffer;
- determining a half-full status based at least on the first buffer;
- determining a relative offset value for the first buffer based on at least a relative buffer level of the second buffer and the half-full status;
- updating the write pointer in accordance with the first clock signal; and
- updating the read pointer in accordance with the second clock signal, a difference between the first clock signal and the second clock signal, and the relative offset value, wherein:
  - the read pointer is modified by a number of buffer units, the number of buffer unites being associated with the relative offset value;
  - the read pointer is decremented by one or more buffer units if an amount of data stored in the first buffer is greater than a first buffer threshold value;
  - the read pointer is incremented by one or more buffer units if an amount of data stored in the first buffer is less than a second buffer threshold value.

* * * * *